Jan. 2, 1951  F. C. EASTMAN  2,536,358
LIMIT STOP FOR AIRCRAFT GUN
MOUNT TRAINING MECHANISMS
Filed May 10, 1948  5 Sheets-Sheet 1

Inventor:
Fred C. Eastman
By his Attorney

Jan. 2, 1951

F. C. EASTMAN 2,536,358

LIMIT STOP FOR AIRCRAFT GUN
MOUNT TRAINING MECHANISMS

Filed May 10, 1948

Inventor:
Fred C. Eastman
By his Attorney

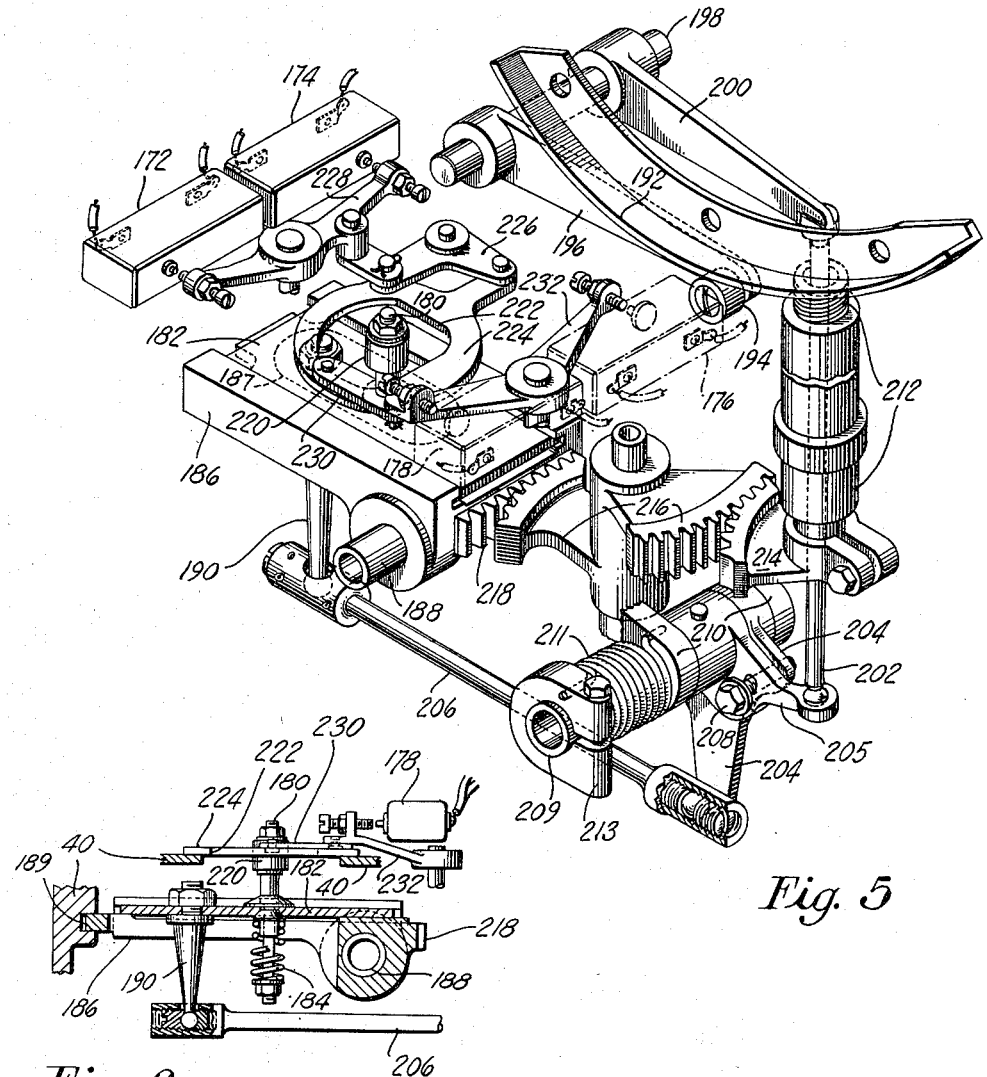

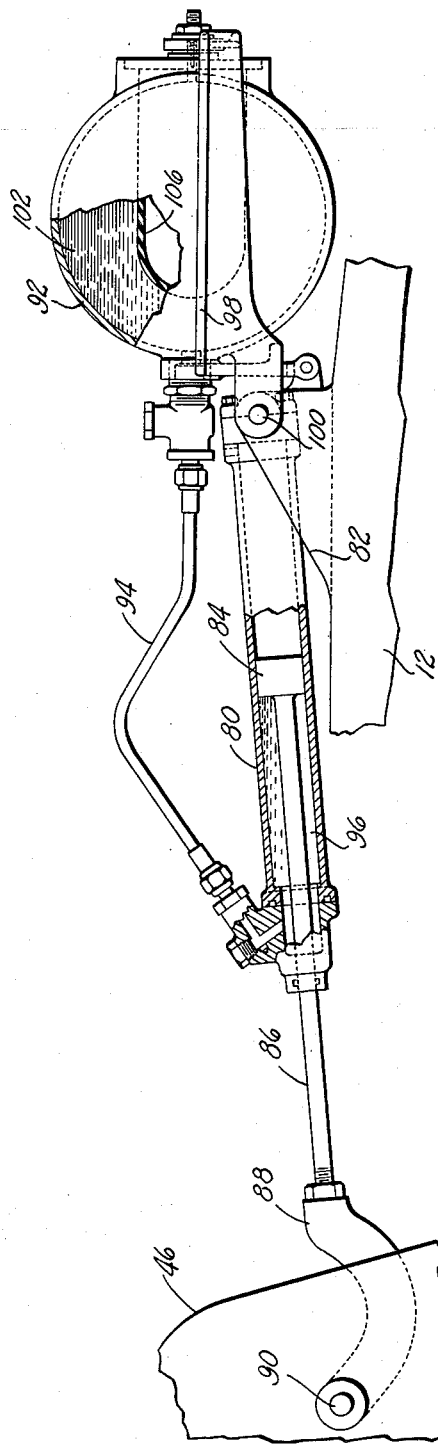

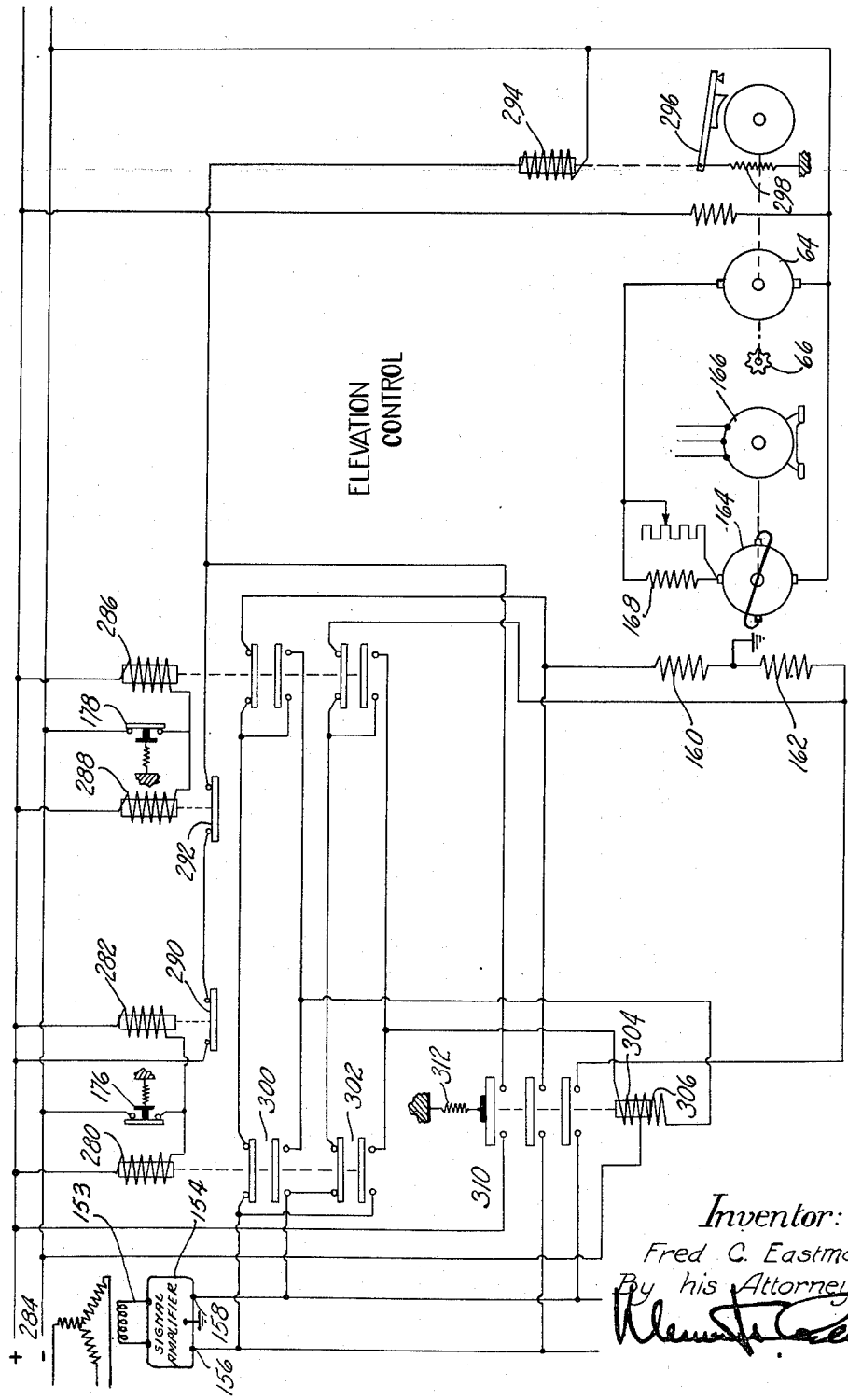

Patented Jan. 2, 1951

2,536,358

UNITED STATES PATENT OFFICE 2,536,358

LIMIT STOP FOR AIRCRAFT GUN MOUNT TRAINING MECHANISMS

Fred C. Eastman, Marblehead, Mass., assignor to United Shoe Machinery Corporation, Flemington, N. J., a corporation of New York Application May 10, 1948, Serial No. 26,116

5 Claims. (Cl. 89—41)

This invention relates to the automatic remote control of guns which are to be fired from an airplane and it is herein illustrated as applied to guns contained within an articulated fairing designed to project rearwardly from the fuselage.

It is well understood that means must be provided for limiting the extent of movement of the guns as they swing in azimuth and elevation so as to avoid damaging the structure of adjacent parts of the plane by collision and also to keep the line of fire out of range of adjacent structures on the plane. These means have previously been arranged to limit the swinging movements to a pyramidal space.

Accordingly, an object of the invention is to provide an improved gun-laying arrangement especially designed for airplane use.

An important feature of the invention resides in an electric control arrangement for limiting the movements of the gun in azimuth and elevation so that movements can take place within a prescribed cone of fire which may, for example, permit elevation or depression 45° from a neutral axis and a corresponding movement in azimuth so that a 90° cone of fire is obtained.

These and other features of the invention will best be understood from a consideration of the following specification, taken in connection with the accompanying drawings, in which Fig. 1 is a side elevation of a gun support with an associated fairing shown in section;

Fig. 5 is an angular view, on a larger scale, of the parts embodied in a limit-stop mechanism;

Fig. 6 is a vertical section through the operating pin of this mechanism;

Fig. 7 is a side elevation, partly in section, of an equilibrator offsetting the tilting effect of the weight of the overhung guns; and Fig. 8 is a circuit diagram illustrating the connection of the limit-stop switches to the electrical drive mechanism.

Figures 1, 2:
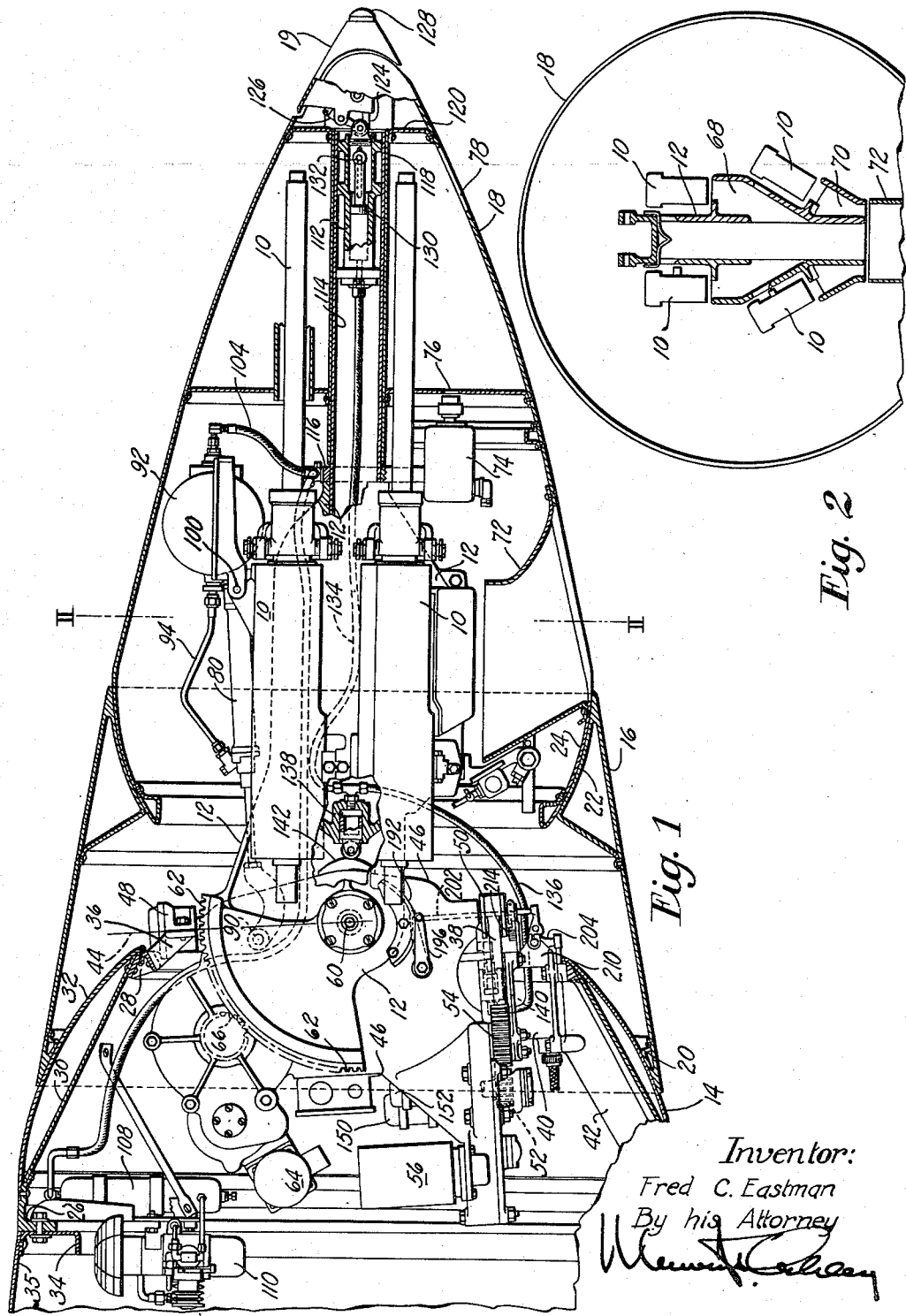
Fig. 2 is a transverse vertical section through a gun adaptor on the line II—II of Fig. 1.

The arrangement to be described is designed as a movable support for four machine guns 10, mounted upon a two-part adaptor 12 (Fig. 2), so that they may be pointed in any direction within a 90° cone of fire. The guns are surrounded by a suitable three section, articulated sheath or fairing which preserves the aero-dynamic contour of the airplane. In this fairing the inner section which, for convenience, will be called a ball 14 (Fig. 1), comprises a zone through a sphere. Associated with this is a member which will be called a ring 16 and a bullet-shaped point portion 18 hereinafter called the point, which is provided with a tip 19. Openings (not shown) in the point are alined with the guns. The ring is provided with an inner edge member 20, the inner surface of which is spherical so that it may slide on the outer surface of the ball 14. The outer end of the ring is provided with a similar internal member 22, the exposed surface of which is spherical to coact with a spherical end portion 24 on the point 18, the latter being urged inwardly against the ring by a hydraulic mechanism to be later described.

The ball is made up of an inner ring 26 and an outer ring 28 joined by a sheet-metal, frustoconical portion 30 as well as by an outer spherical portion 32. The inner ring is bolted to a ring-like channel 34 secured inside a corresponding circular opening in the airplane wall 35.

The gun mount is supported at the top by a bracket 36 attached to the outer ring 28 of the ball and at the bottom by a fixed gear segment 38 on top of a limit switch casing 40 which is carried on top of a supporting bracket 42 which extends between the inner and outer rings 26, 28.

Pivoted for movement about a substantially vertical axis 44 is a gun column 46 in the form of an irregularly shaped casting which is supplied with upper and lower pivot pins received within bearings 48 and 50. The upper bearing 48 comprises reversely arranged conical rolls to take the thrust of the column either up or down. This bearing 48 is carried by the bracket 36 while the lower bearing 50 which serves as a pivot is carried on the gear segment 38. Rotation imparted to a pinion 52 engaging the teeth 54 on the gear segment 38 swings this column about its axis 44 to obtain movements of the guns in azimuth and the power for this swinging movement is obtained from a direct current motor 56 mounted on the column and which is connected by reducing gears to the pinion 52.

The gun adaptor 12 is pivoted on the gun column on a horizontal axis 60 to provide movements in elevation and has a gear segment 62 centered on the axis 60 so that changes in elevation may be effected by an electric motor 64 supported on the column 46 and connected by reduction gears (not shown) to a pinion 66 which meshes with the teeth of the gear segment 62.

It will be noted from Fig. 2 that the gun adaptor is provided with chutes 68 and 70 which are directly above a passageway 72 provided at the bottom of the bullet-shaped point 18, thus permitting disposal of cartridge casings, belt links and the like. A camera 74 is supported on a bracket attached to the forward end of the adaptor and is pointed at the target through openings 76 and 78.

To compensate for the obvious unbalance of the adaptor assembly 12 and the guns 10, an equilibrator has been provided which comprises a cylinder 80 pivotally connected at its right end at the point 100 to brackets 82 (Fig. 7) upon the gun adaptor. The equilibrator is provided with a piston 84 having a piston rod 86 joined to a yoke 88 pivoted at 90 to the gun column 46. Oil 102 under pressure from an accumulator 92 is delivered through a pipe 94 (Fig. 1) to the cylinder portion 96 which lies at one side of the piston 84. The accumulator 92 is supported in a ring-like bracket 98 pivoted to the brackets 82 on the adaptor. The pressure upon the oil 102 within the accumulator 92 is maintained by providing air pressure through a flexible pipe 104 to one side of a flexible diaphragm 106 within the accumulator. The pipe 104 is joined to an air storage tank 108 which is supplied from a motor driven compressor 110. It will be understood that the hydraulic system operating from the accumulator 92 to the cylinder 80 renders it easy to avoid creep. At the same time it is possible to maintain exactly the desired pressure in the accumulator 92 by maintaining a suitable air pressure against the diaphragm 106. As the gun is moved down, the pressure increases in the area 96 but the lever arm between the center 60 and the cylinder axis decreases, thus leaving the torque substantially constant.

When the guns are pointed at an extreme angle, the change in relation between the point 18 and the base of the ball 14 effects a change in the straight line distance between the center of the ball 14, for example, and the tip of the point. Some yieldable arrangement must, therefore, be provided for holding the point 18 in contact with the ring 16 and consequently holding the ring 16 against the ball 14. It was found too that the friction between these fairing parts, at or near the positions of considerable angular displacement, was very much increased by any ordinary spring arrangement which might be devised for holding them together and this change was sufficient to greatly increase the load upon the motors 56 and 64 which produce the change in displacement.

Figures 3, 4:
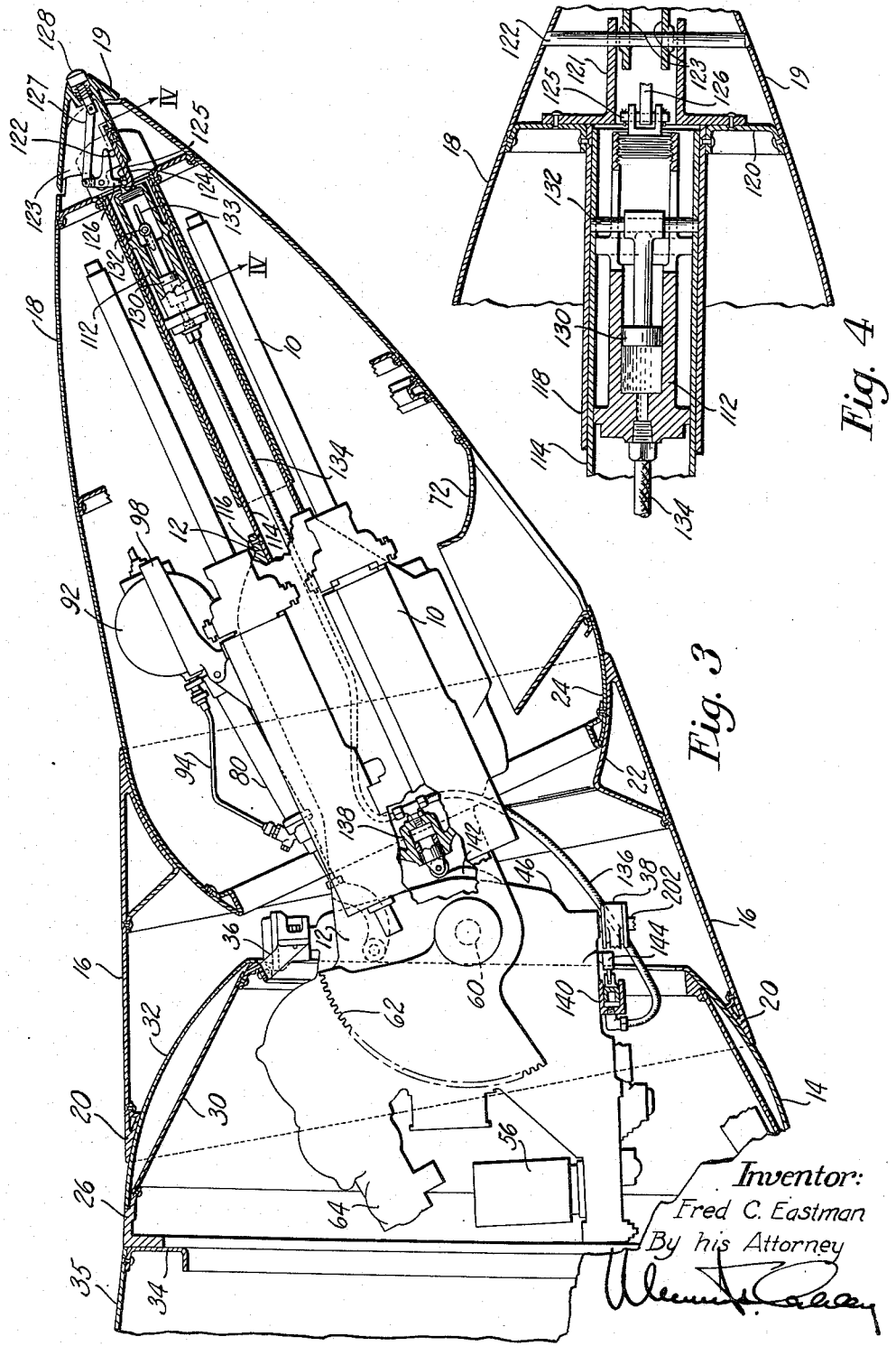
Fig. 3 is a view similar to Fig. 1 but with the guns tilted upwardly.
Fig. 4 is an enlarged horizontal section, through the tip of the fairing, taken on the line IV—IV at the right end of Fig. 3.

Accordingly, a hydraulic system has been provided for holding the point 18 inwardly against the ring 16 and this system includes a hydraulic cylinder 112 which is slidable within an inner tube 114 clamped at 116 to the outer end of the adaptor 12 while the cylinder is attached to the point 18. Surrounding the tube 114 is an outer tube 118 which is slidable on the inner tube and the outer end of which is fastened to a cross partition 120 in the point 18. On this cross partition 120, are forwardly extending brackets 121 (Fig. 4) holding a pin 122 on which the tip 19 is tiltably secured by means of parallel ribs 123. Rigidly secured to the ribs 123, is a hook 124 (Fig. 3) adapted to engage a cross pin 125 which is secured to the end of the cylinder 112 and this hook may be disengaged by tilting the tip.

Accidental tilting of the tip 19 is prevented by the end of a stub arm on a retaining latch 126 pivoted between ears extending rearwardly from the ribs 123 and connected by a link 127 to a push button 128 at the end of the tip. When it is desired to remove the point 18 of the fairing the button 128 is pushed inwardly against a coil spring thus moving the stub arm aside and permitting the tip 19 to be tilted around its pivot 122 so as to drop the hook 124 from the cross pin 125 at the end of the cylinder. The point 18 and its cap 19 may then be withdrawn axially, with the outer tube 118 sliding on the inner tube 114. When the button is not depressed, its spring urges the latch 126 clockwise, as viewed in Fig. 3, to a position determined by contact of a long arm, on the latch, with the pin 122, thus holding the end of the stub arm over the cross pin 125 and preventing tilting of the tip 19.

Within the cylinder 112 is a piston 130 connected by a cross pin 132 to the inner tube 114 and hence to the adaptor. Fluid under pressure fills the space between the piston and the left end of the cylinder. As the point portion 18 moves outward with respect to the inner tube 114 the space between the piston 130 and the cylinder heads decreases thus increasing the pressure acting to hold portion 18 inward and increasing the friction between portion 18 and the ring 16 and between the ring and the ball 14 with a resulting heavy load on the driving motors as the gun is trained. To avoid this the cylinder 112 is connected by pipes 134 and 136 to a cylinder 138 which is mounted on the adaptor 12 and to a cylinder 140 (Fig. 3) which is mounted on the gun column 46. Each of these cylinders has a piston having an attached roller which rides, in the first instance, against a cam 142 fixed on the gun column 46 and in the second instance, against a cam 144 attached to the gear segment 38 which is mounted on the fixed bracket 42 attached to the plane. By means of this arrangement the pressure within the cylinder 138 and hence in cylinder 112 is held at the desired maximum as the guns are pointed straight to the rear and is decreased as the guns are elevated or depressed, this following from the shape of the cam 142. A similar shape of the cam 144 causes the pressure to be maximum within the cylinder 140 and hence in cylinder 112 when the guns are pointed directly to the rear and decreases this effect as the guns are swung to one side or the other. Consequently, the pressure in the hydraulic system is relieved as the guns and the portion 18 are swung away from center 30 as to maintain a free turning engagement between the point 18 and the ring and between the ring and the ball.

Any suitable system may be employed for the remote control of the motors 56 and 64 so that the guns may be laid or directed at the target in accordance with the wishes of a gunner who operates a sight (not shown) capable of being swung in azimuth and tilted in elevation. The arrangement shown is electrical and alternating current signals corresponding to the movements of the sight are produced by four self-synchronous generators driven thereby, some of which are electrically connected to two similar self-synchronous transformers 150 and 152 which are concerned with movements in azimuth while the others are connected to a similar pair (not shown) which are concerned with movements in elevation. These signals resulting from a lack of correspondence between the position of the sight and the position of the guns, are transmitted by leads 153 through an amplifier 154 (Fig. 8) by which the alternating current signals are amplified and transformed to direct current and are transmitted from the terminals 156 and 158 on this amplifier to the opposite control fields 160 and 162 of an armature-excited, dynamo-electric machine which is driven by a motor 166. The mid point of these fields is grounded on a mid point of the output of the amplifier 154. This machine acts as a generator whose polarity and voltage output is readily controlled and is frequently designated by the trade name "Amplidyne." These control fields 160 and 162 are along an axis represented by brushes which are connected through a series compensating field winding 168 to the driving motor 64. The flux along this control axis is in quadrature with the flux along an axis represented by other brushes which are short circuited. The respective control fields 160 and 162 oppose each other and the resultant depends upon the direction and amplitude of the current delivered from the amplifier 154. This dynamo-electric machine 164 delivers current at a varying voltage to the motor 64 to drive it at a varying speed depending upon the divergence between the sight and the guns in elevation and it will be understood that when the self-synchronous transformers (not shown) which are responsive to movements in elevation, indicate a position of correspondence between the sight and the guns then the control fields 160 and 162 balance out and no further current is delivered by the amplidyne generator 164 and the motor 64 stops.

It will be understood that two separate sets of self-synchronous generators and transformers such as have just been described are employed, one for movements in azimuth and one for movements in elevation and that each of these sets is provided with an amplifier for delivering current to the control field windings of an "Amplidyne" generator. Only one such arrangement is illustrated in Fig. 8 which is the one controlling movements in elevation. The use of two self-synchronous generators and two self-synchronous transformers on the sight and on the gun drive respectively is well understood and makes for greater accuracy and smoothness in operation. These machines at the sight are connected by gears in a ratio of 31 to 1 as are the similar transformers such as those shown at 150, 152 on the gun column 46. The transformer devices are also geared to the drive terminating in the pinion 52 so that the 1-1 self-synchronous transformer 150 moves in a direct ratio with the azimuth movements of the gun column while the coacting transformer 152 moves in a prime ratio of 31 to 1 with respect thereto.

The foregoing explanation has been included for the sake of facilitating an explanation of the limit-stop switch mechanism of Figs. 5 and 6 by means of which the movements of the guns are restricted to the largest cone of fire which is permitted by the range of movement mechanically possible for the articulated fairing comprising the ball 14, the ring 16 and the point 18. It will be understood that when limit switches are employed outside the gun mount or in some such location as are the physical limit stops shown in Letters Patent of the United States 2,391,956 granted January 1, 1946, upon my application, then the area defined is a pyramid, the largest angle at the apex of which is represented by the angle between diagonally opposite corner lines of the pyramid. With the arrangement herein shown, however, and which is now to be described, it is possible to employ the additional space between such a pyramid and a cone of fire which is inscribed to include the corners of the pyramid.

To this end, a centrally located mechanism shown in Figs. 5 and 6 is employed to cause movements of the adaptor 12 in elevation and in azimuth to operate a series of limit switches 172, 174, 176 and 178 which are arranged to break the connections between the amplifiers and the control fields so as to stop further movement in any desired direction. The movements of the gun produce corresponding movements of a pin 180 which is mounted in and is held normally vertical with respect to a plate 182 but which may tilt with respect thereto upon yielding of a spring 184 in order to avoid damage to the mechanism. To produce representative movements of this pin 180, the plate 182 is slidable in a carrier 186 having a clearance opening 187 for the pin. This carrier in turn is mounted for sliding movement, laterally or at right angles to the direction of sliding movement of the plate, by supporting it on a tube 188 which is fixed in the casing 40 (Fig. 1) in which this mechanism is mounted and in a groove 189 in said casing.

Movements of the slide 182 in its carrier 186 to represent changes in elevation are effected by a post 190 which is rigidly mounted on the slide and is physically operated by means of a cam 192 which is mounted on the gun adaptor 12 and which is designed with a constant increment so that inches of movement of the slide 182 are, for example, equal to a predetermined number of degrees of angular movement of the gun. This cam 192 engages a roll 194 on the end of an arm 196 attached to a pin 198 which is journaled in the gun column 46 and which also carries an arm 200 bearing on the upper end of a rod 202 connected through a two part bell crank 204, 205 and a connecting rod 206 with the post 190. Ball connections are employed to insure freedom of movements. The bell crank part 205 is slotted to pass a clamp screw 208 threaded in the part 204 thereby to provide for a setting-up adjustment. The bell crank part 205 is pinned to a pivot tube 209 journaled in brackets 210 attached to the outside of the casing 40. A coil spring 211 between one bracket and a block 213 clamped on the end of the pivot tube 209 serves to hold the roll 194 against its cam 192.

In order that the movements of the pin 180 may also reflect movements of the gun in azimuth, a tube 212 joined to the gun column 46 is provided with a gear segment 214 clamped on the tube and capable of setting-up adjustment thereon. The segment 214 transmits motion to the carrier 186 by means of opposed integral segments 216 which mesh with the segment 214 and with teeth 218 on the carrier 186. The pin 180, provided with a rubber collar 220, moves within the opening 222 of a hollow, ring-like template 224.

This template is connected by a bell crank 226 pivoted on the control box and by a link to a switch arm 228 swingably mounted on a fixed axis in the control box and having terminal screws coacting with the operating buttons of microswitches 172 and 174. The template 224 is also connected by a link 230 to another similarly mounted switch arm 232 which is arranged to operate the microswitches 176 and 178. The opening 222 of the template which is swung between these switch arms is designed so as to give the desired cone of fire in accordance with the dimensions of the gun mount and the fairing associated with it and the ordinates and abscissae of the position of the pin 180 define corresponding positions of the guns in space.

The way in which the limit switches 172 to 178 are included in the circuits of the control fields 160 and 162 of the amplidyne generator is best shown in Fig. 8 where the switch 176 which determines the limit of depression of the gun and the switch 178 which determines the limit of elevation of the gun are shown.

To effect the desired result these mechanically operated switches are each included in circuit with a pair of relays. Thus the switch 176 is in series with the coils of a field relay 280 and a limit relay 282. These relays are normally energized from a direct current supply circuit 284 from which they receive power whenever the apparatus has been put in operating condition. Similarly the limit switch 178 controls the coils of a field relay 286 and a limit relay 288. The contacts 290 and 292 of the limit relays are in series with one another and with the coil 294 of a brake solenoid which, when it is energized as it is in normal operation, relieves the pressure of a brake arm which is normally drawn against the brake by a spring 298. The field relay 280 has a pair 300 of upper contactors and a pair 302 of lower contactors and the field relay 286 is similarly arranged.

In the operating conditions which are shown in Fig. 8, these field relay contacts in their upper position serve to connect the terminals of the control field windings 160 and 162 of the "Amplidyne" to the terminals 156 and 158 of the signal amplifier 154. The lower contact bars of each pair 300 and 302 control the circuits from the signal amplifier terminals to the opposed coils 304 and 306 of a back-out relay 310. The mid point between these coils is joined to the negative side of the supply circuit 284. The contact bars of this back-out relay are normally held in an open position by a spring 312.

It will be understood that the breaking of the circuit by the limit switch such as that at 176 will have been caused by a movement of the sight by the gunner to a position calling for movement of the gun beyond its desired range and if this position of the sight is maintained after the limit switch has been opened then the current to the back-out relay will be in such a direction that the resultant field in the solenoid of the latter is ineffective to close the contacts thereof. If, however the gunner moves the sight to a position within the prescribed cone of fire then the back-out relay will close, permitting the guns to be backed out of their abnormal position. The closing of the lower sets of contacts of the back-out relay 310 will connect the signal amplifier terminals to the terminals of the control fields 160 and 162 while its upper contacts will close a circuit to energize the brake solenoid 294 so as to lift the brake arm 296 to the position shown and operation of the system may then proceed in normal fashion for the reason that the pressure upon the limit switch 178 will be relieved by the withdrawal of the guns, permitting that switch to close a circuit to energize the field relay 286 to reestablish the normal circuits to the control fields and also deenergizing the back-out relay 310. At the same time the limit relay 282 will be reenergized thus reestablishing the circuit to the brake solenoid 284.

Inasmuch as the control which is illustrated in Fig. 8 is duplicated for control of movements in azimuth it will be seen that the guns may be laid automatically by remote control, being balanced by the equilibrator 80. Although no mention has been made of the firing circuits since that forms no part of the invention, these will be understood to be controlled from the sight and preferably will be provided with interrupter means operative when the guns move beyond the limit cone of fire which is prescribed by the limit switches 172 to 178. During these movements of the gun the pressure which holds together the parts 14, 16 and 18 of the articulated fairing will be automatically controlled so as to prevent the air stream from separating these parts by reason of any undue slackening of the pressure required to hold the parts together and at the same time sufficient pressure will always be maintained within the cylinder 112 to hold them together but without causing any undue friction. The feeding of ammunition to the guns can be carried out automatically by means of any well-known system which delivers the cartridges automatically from a storage receptacle inside the plane itself and allows the links of the conveyor chain as well as the cartridge casings and any duds to fall out through the chute 77.

Features of the invention relating to the articulated fairings are not claimed herein since they are included in a divisional application Serial No. 77,810, filed February 23, 1949, in my name, and patented November 21, 1950, as Patent No. 2,530,571.

Having thus described my invention, what I claim as new and desire to secure by Letters Patent of the United States is:

1. A limit stop for controlling the limit of movement of a gun supported for swinging movement and having a gun laying means, said limit stop comprising control devices for stopping the movement imparted by said laying means when the limit is reached, means for operating said control devices, and means for moving said operating means comprising a hollow ring-like template connected to the moving means and a member within the hollow template arranged for movement in a plurality of directions to an extent proportionate to the movements of the gun in corresponding directions to move said template.

2. In a limit stop for a gun supported for swinging movement and having means for moving the gun to point it in the desired direction, control devices for stopping said gun moving means at predetermined boundaries, and means for operating said control devices comprising a swinging arm, a hollow template connected to said arm and pivotally supported for movement toward and away from the arm, a pin within and arranged to swing said template, and means connected to the gun for moving said pin in a direction and to an extent corresponding to the movement of the gun.

3. In a limit stop for a gun supported for movements by power means in elevation and in azimuth, a plurality of switches for controlling said power means, arms for operating said switches, a hollow template swung between said arms and a pin projecting through said template, said pin being mounted for movement in a plurality of directions, and means for connecting the pin to the gun thereby to impart movements to the pin corresponding to the movements of the gun to move the template when the limit is reached.

4. In a limit stop for a gun supported for movement by power means in a plurality of directions, a plurality of control devices for limiting the action of said power means in four directions, a slide mounted for movement in four directions, means for imparting movements thereto corresponding to movements of the gun, a pin on said slide, a template surrounding said pin and movable thereby, and means for connecting said template to said control devices.

5. In a limit stop for a gun supported for movement by electrical means to and fro both in azimuth and elevation, switches connected to limit the extent of movement imparted to the gun by said electrical means in any one of the four directions, swinging arms for operating said switches, a template linked to said arms, a pin movable in four directions corresponding to the movements of the gun and positioned to contact with and to move said template thereby to operate the switches.

FRED C. EASTMAN.

REFERENCES CITED

The following references are of record in the file of this patent:

UNITED STATES PATENTS

| Number | Name | Date |
|---|---|---|
| 906,939 | Ryan | Dec. 15, 1908 |
| 1,460,419 | Joyce | July 3, 1923 |
| 1,460,420 | Joyce | July 3, 1923 |
| 1,820,820 | Muller | Aug. 25, 1931 |
| 1,958,245 | Mittag et al. | May 8, 1934 |
| 2,196,269 | Morris | Apr. 9, 1940 |
| 2,199,971 | Sanders | May 7, 1940 |
| 2,247,842 | Kamenarovic | July 1, 1941 |
| 2,278,688 | Caminez | Apr. 7, 1942 |
| 2,342,779 | Zerangue | Feb. 29, 1944 |
| 2,349,101 | Lesnick | May 16, 1944 |
| 2,356,152 | Edwards et al. | Aug. 22, 1944 |
| 2,378,670 | Walle et al. | June 19, 1945 |
| 2,407,451 | Reiniger | Sept. 10, 1946 |
| 2,408,277 | Soenke | Sept. 24, 1946 |
| 2,409,406 | Trotter | Oct. 15, 1946 |
| 2,420,666 | Joy et al. | May 20, 1947 |
| 2,434,654 | Watkins et al. | Jan. 20, 1948 |
| 2,439,878 | Villepigue | Apr. 20, 1948 |
| 2,450,551 | Harrington | Oct. 5, 1948 |

FOREIGN PATENTS

| Number | Country | Date |
|---|---|---|
| 319,617 | France | July 26, 1902 |